Patented Nov. 18, 1924.

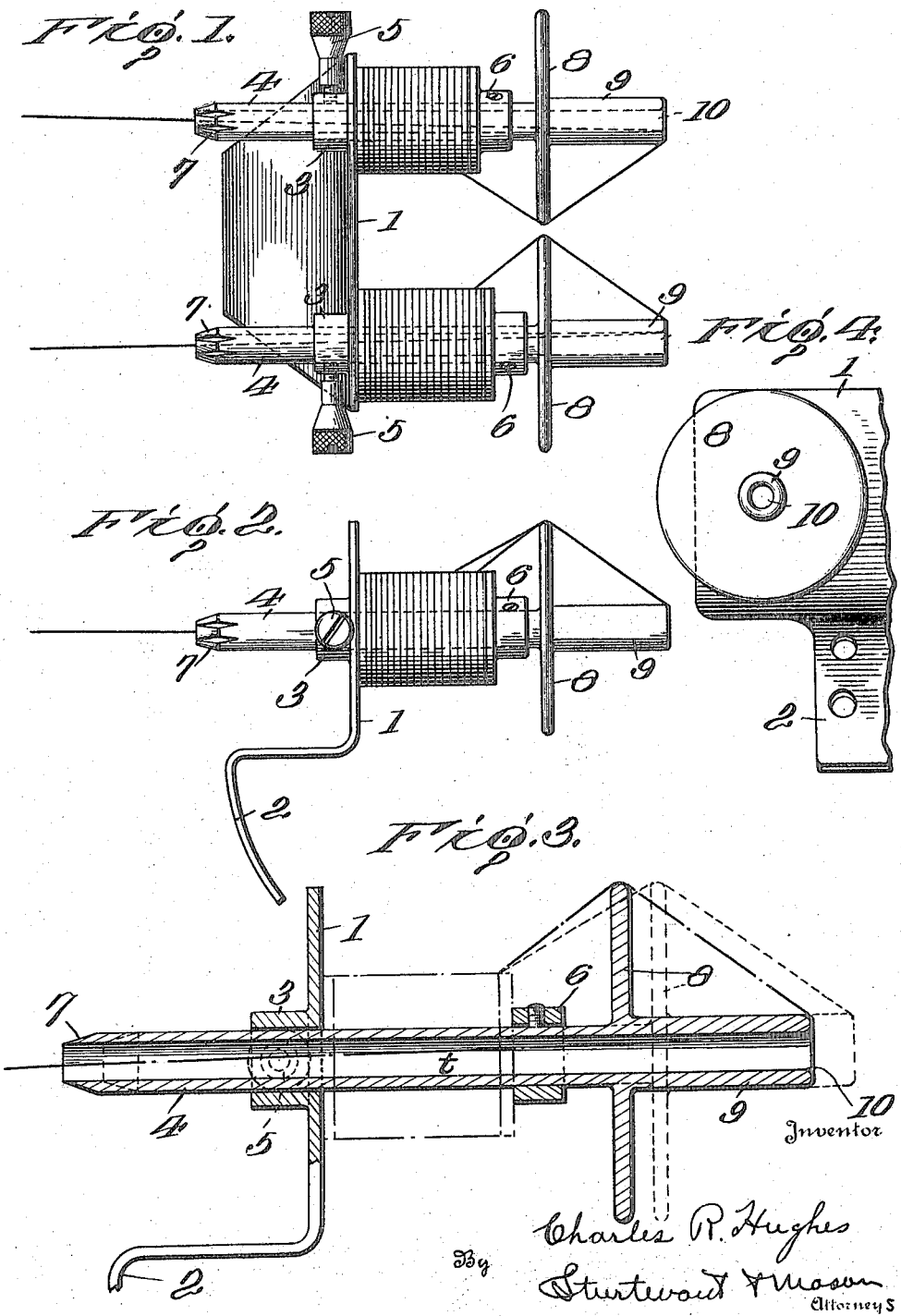

1,515,682

UNITED STATES PATENT OFFICE.

CHARLES R. HUGHES, OF UTICA, NEW YORK, ASSIGNOR TO UNION SPECIAL MACHINE COMPANY, OF CHICAGO, ILLINOIS, A CORPORATION OF ILLINOIS.

SPOOL HOLDER.

Application filed August 3, 1921. Serial No. 489,447.

*To all whom it may concern:*

Be it known that I, CHARLES R. HUGHES, a citizen of the United States, residing at Utica, in the county of Oneida, State of New York, have invented certain new and useful Improvements in Spool Holders, of which the following is a description, reference being had to the accompanying drawing and to the figures of reference marked thereon.

The invention relates to new and useful improvements in spool holders, and more particularly to a spool holder adapted to support one or more spools so that the thread running therefrom may be led to the stitching mechanism of the sewing machine.

An object of the invention is to provide a spool holder having means for rigidly holding the spool, and a disk over which the thread is led from the spool to the stitching mechanism, wherein the disk may be adjusted in a direction endwise of the spool toward and from the spool for varying the drag on the thread.

A further object of the invention is to provide a spool holder of the above type wherein the spool is supported by a sleeve and wherein the end of the sleeve is shaped so as to form a fluted reamer for reaming out the hole in the spool so as to facilitate the placing of the spool on the sleeve.

These and other objects will in part be obvious and will in part be hereinafter more fully disclosed.

In the drawings which show by way of illustration one embodiment of the present invention:—

Figure 1 is a top plan view of a spool holder embodying my improvements;

Fig. 2 is a side view of the spool holder; and

Fig. 3 is an enlarged sectional view and showing the adjustment of the disk for varying the drag on the thread.

Fig. 4 is an end view of one of the spool holders.

The invention consists broadly in a spool holder which includes a supporting bracket carrying one or more holders or supports for commercial spools of thread. Each holder includes a sleeve which is detachably carried by the bracket. This sleeve is approximately of the same diameter as the hole in the commercial spool of thread. It is well known, however, that these holes often vary in size, and therefore, the sleeve is provided with a tapered fluted reamer by means of which the hole may be reamed out so as to facilitate the passing of the sleeve through the spool. Mounted on the sleeve is an adjustable collar which is adapted to bear against the end of the spool and clamp the spool against the bracket so that the spool is held from rotation. Also mounted on the sleeve is a disk of considerable larger diameter than the spool. The thread runs from the spool over the disk and then enters the outer end of the sleeve and passes through the sleeve.

Referring more in detail to the drawings, my improved spool holder consists of a supporting bracket 1 having a portion 2 by which the same is supported either on or adjacent the overhanging arm of a sewing machine. The bracket is provided with a projecting collar 3 which may be soldered or formed integral with the bracket. The bracket has an opening in line with the opening through the collar. A sleeve 4 is adapted to be inserted through the opening in the bracket and through the collar, and is detachably and adjustably held in the bracket by means of a hand screw 5. Mounted on the sleeve 4 is an adjustable collar 6.

The extreme left-hand end of the sleeve is provided with a fluted reamer 7. The sleeve is removed from the bracket, the fluted reamer inserted in the end of the spool, and the hole in the spool reamed out to permit the sleeve to pass therethrough, unless, of course, the hole through the spool is of sufficient size to receive the sleeve. The sleeve is moved endwise through the opening in the bracket until the spool is firmly clamped between the collar 6 and the bracket, then the hand-screw 5 is set up to secure the sleeve, and this firmly attaches the spool to the bracket, so that it will not rotate.

Also attached to the sleeve 4 is a disk 8. The portion of the sleeve 9 to the right of the disk 8 is of slightly larger diameter than the reamer of the sleeve. The inner and outer edges of the sleeve are rounded as indicated at 10 in the drawings so as to provide a smooth surface over which the thread runs. The thread is indicated at *t* and is led from the spool over the edge of the disk, then over the rounded edge 10 at the end of the sleeve, and through the sleeve, It will readily be seen that when the thread is pulled on, it will run smoothly over the disk and through the sleeve. The disk places a certain drag on the thread and prevents kinking and entanglement of the thread. A pull on the thread causes the thread to unwind from the spool and travel in a circular direction around the disk 8. The amount of drag put on the thread is determined by the angle at which the thread runs from the spool to the disk 8. The shorter the angle, the greater the drag. By loosening the collar 6 and the hand screw 5, it will readily be seen that the position of the disk relative to the spool may be adjusted and thus the drag on the thread varied. I have shown in the drawings, two spool holders. They are alike in construction and similar reference letters have been applied to like parts. It will be understood that any number of spool holders may be used, one for each thread used by the sewing machine.

The present improvements are directed particularly to the adjustment of the disk for the varying of the drag on the thread and the providing of the fluted reamer for the boring of the spool to facilitate the insertion of the sleeve in the spool.

It is obvious that minor changes in the details of construction may be made without departing from the spirit of the invention as set forth in the appended claims.

Having thus described the invention, what I claim as new and desire to secure by Letters-Patent, is:—

1. A spool holder including in combination, a bracket, a sleeve carried by said bracket, means for clamping a spool in fixed position on said sleeve, a disk carried by said sleeve and positioned a distance out from the end of the spool, whereby the thread from the spool may be led over the disk and through the sleeve, and means whereby the distance between the spool and the disk may be varied for varying the drag on the thread.

2. A spool holder including in combination, a bracket, a sleeve extending through said bracket and adapted to support the spool, an adjustable collar on the sleeve adapted to clamp the spool against the bracket to prevent the spool from turning, a disk on said sleeve between the collar and the outer end of the sleeve, and means for adjustably holding the sleeve in the bracket whereby the position of the disk relative to the spool may be varied.

3. A spool holder including in combination, a supporting bracket, a collar rigidly carried by the bracket, said bracket having an opening in alinement with the opening in the collar, a sleeve adapted to pass through the opening in the bracket and through the collar, a set screw adapted to secure the sleeve in the collar, a collar adjustable lengthwise of the sleeve and adapted to clamp a spool on the sleeve against the bracket, and a disk rigidly secured to the sleeve and located between the adjustable collar thereon and the outer end of the sleeve and at a distance back from the end of the sleeve.

4. A spool holder including in combination, a supporting bracket, a sleeve carried by the bracket and adapted to support the spool, a disk mounted on said sleeve, and means whereby the position of the disk relative to the end of the spool may be varied, the thread from said spool being adapted to be led over the disk and through the sleeve, said sleeve, at the end thereof from which the thread is delivered having a fluted reamer for reaming out the hole in the spool.

5. A spool holder including in combination, a sleeve extending through the hole in the spool and through which sleeve the thread is led from the spool, said sleeve having a fluted reamer in the end thereof for reaming out a hole in the spool for the insertion of the sleeve through the spool.

In testimony whereof, I affix my signature.

CHARLES R. HUGHES.